(12) United States Patent
Vaage et al.

(10) Patent No.: US 7,123,543 B2
(45) Date of Patent: Oct. 17, 2006

(54) METHOD FOR SEISMIC EXPLORATION UTILIZING MOTION SENSOR AND PRESSURE SENSOR DATA

(75) Inventors: Svein T. Vaage, Houston, TX (US); Jacob T. Fokkema, Schiedam (NL); Peter M. van den Berg, Pijnacker (NL)

(73) Assignee: PGS Americas, Inc., Houston, TX (US)

( * ) Notice: Subject to any disclaimer, the term of this patent is extended or adjusted under 35 U.S.C. 154(b) by 272 days.

(21) Appl. No.: 10/621,222

(22) Filed: Jul. 16, 2003

(65) Prior Publication Data

US 2005/0013194 A1   Jan. 20, 2005

(51) Int. Cl.
*G01V 1/38*   (2006.01)
(52) U.S. Cl. .......................................... 367/24; 367/21
(58) Field of Classification Search .............. 367/21, 367/24; 702/14, 17
See application file for complete search history.

(56) References Cited

U.S. PATENT DOCUMENTS

| | | | |
|---|---|---|---|
| 4,486,865 A | | 12/1984 | Ruehle |
| 4,935,903 A | | 6/1990 | Sanders et al. |
| 4,979,150 A | | 12/1990 | Barr |
| 5,150,331 A | * | 9/1992 | Harris et al. .................. 367/50 |
| 5,621,700 A | | 4/1997 | Moldoveanu |
| 6,477,470 B1 | * | 11/2002 | Fokkema et al. .............. 367/21 |
| 6,512,980 B1 | * | 1/2003 | Barr ................................ 702/1 |
| 6,747,913 B1 | * | 6/2004 | Fokkema et al. .............. 367/24 |
| 6,775,618 B1 | * | 8/2004 | Robertsson et al. .......... 367/24 |

FOREIGN PATENT DOCUMENTS

| | | |
|---|---|---|
| GB | 2 363 459 | 12/2001 |
| GB | 2 375 606 | 2/2002 |

OTHER PUBLICATIONS

J.T. Fokkema, P.M. Van Den Berg, "Seismic Applications of Acoustic Reciprocity", ISBN0-444 890444, Elsevier Science Publishers, 1993, Chapter 10.1, pp. 199-210, Amsterdam, The Netherlands.
J.W.A.V. Schoolmeesters, "Three-Dimensional Processing of Marine Seismic Data by Spectral Decomposition", ISBN 90-9014856-6, Ph.D. Thesis, Delft University of Technology, 2001, 4.2.2., pp. 63-66.

* cited by examiner

*Primary Examiner*—Ian J. Lobo
(74) *Attorney, Agent, or Firm*—E. Eugene Thigpen; Charles R. Schweppe

(57) ABSTRACT

A method is disclosed for deghosting seismic data. The data include measurements of a vertical component of particle motion and pressure. The measurements are substantially collocated and made at a plurality of spaced apart positions. The method includes transforming the data into the spatial frequency domain, and separating upgoing and downgoing wavefield components of the transformed data. Water surface multiples may also be removed by decomposing the signals made at a plurality of seismic energy source locations into upgoing and downgoing wavefields.

30 Claims, 3 Drawing Sheets

METHOD FOR SEISMIC EXPLORATION UTILIZING MOTION SENSOR AND PRESSURE SENSOR DATA

BACKGROUND OF INVENTION

1. Field of the Invention

The invention relates generally to the field of seismic exploration. More specifically, the invention relates to methods for processing seismic data acquired using both motion sensors and pressure sensors.

2. Background Art

In seismic exploration, seismic data are acquired by imparting acoustic energy into the earth near its surface, and detecting acoustic energy that is reflected from boundaries between different layers of subsurface earth formations. Acoustic energy is reflected when there is a difference in acoustic impedance between adjacent layers to a boundary. Signals representing the detected acoustic energy are interpreted to infer structures and composition of the subsurface earth structures.

In marine seismic exploration, a seismic energy source, such as an air gun, or air gun array, is typically used to impart the acoustic energy into the earth. The air gun or array is actuated at a selected depth in the water typically while the air gun or array is towed by a vessel. The same or a different vessel tows one or more seismic sensor cables, called "streamers", in the water. Generally the streamer extends behind the vessel along the direction in which the streamer is towed. Typically, a streamer includes a plurality of hydrophones disposed on the cable at spaced apart, known positions along the cable. Hydrophones, as is known in the art, are sensors that generate an optical or electrical signal corresponding to the pressure of the water or the time gradient (dp/dt) of pressure in the water. The vessel that tows the one or more streamers typically includes recording equipment to make a record, indexed with respect to time, of the signals generated by the hydrophones in response to the detected acoustic energy. The record of signals is processed, as previously explained, to infer structures of and compositions of the earth formations below the locations at which the seismic survey is performed.

Marine seismic data often include two particular artifacts that require techniques to account for in order to more accurately infer the structure and composition of the subsurface earth formations. These two artifacts, known as ghosting and water layer multiple reflections, arise because water has a substantially different acoustic impedance than the air above the water surface, and because water typically has a substantially different acoustic impedance than the earth formations at the bottom of the water (or sea floor).

Ghosting and water layer multiples can be understood as follows. When the air gun or air gun array is actuated, acoustic energy radiates generally downwardly where it passes through the sea floor and into the subsurface earth formations. Some of the acoustic energy is reflected at subsurface acoustic impedance boundaries between layers of the earth formations, as previously explained. Reflected acoustic energy travels generally upwardly, and is ultimately detected by the seismic sensors (hydrophones) on the one or more streamers. After the reflected energy reaches the streamers, however, it continues to travel upwardly until it reaches the water surface. The water surface has nearly complete reflectivity (reflection coefficient equal to unity) with respect to the upwardly traveling acoustic energy. Therefore, nearly all the upwardly traveling acoustic energy will reflect from the water surface, and travel downwardly once again. The water-surface reflected acoustic energy will also be shifted in phase by about 180 degrees from the upwardly traveling incident acoustic energy. The surface-reflected, downwardly traveling acoustic energy is commonly known as a "ghost" signal. The ghost signal causes a distinct "notch", or attenuation of the energy within a limited frequency, in the acoustic energy detected by the hydrophones. The frequency of the notch in the detected acoustic signal is related to the selected depth at which the streamer is disposed, as is well known in the art.

The downwardly traveling acoustic energy reflected from the water surface, as well as acoustic energy emanating directly from the seismic energy source may reflect from the water bottom and travel upwardly, where it is detected by the hydrophones. This same upwardly traveling acoustic energy will also reflect from the water surface, once again traveling downwardly. Acoustic energy may thus reflect from both the water surface and water bottom a number of time before it is attenuated, resulting in so-called water layer reverberations. Such reverberations can have substantial amplitude within the total detected acoustic energy, masking the acoustic energy that is reflected form subsurface layer boundaries, and thus making it more difficult to infer subsurface structures and compositions from seismic data.

It is known in the art to provide a so-called "dual sensor" cable for detecting acoustic (seismic) signals for certain types of marine seismic surveys. One such cable is known as an "ocean bottom cable" (OBC) and includes a plurality of hydrophones located at spaced apart positions along the cable, and a plurality of substantially collocated geophones on the cable. The geophones are responsive to the velocity of motion of the medium to which the geophones are coupled. Typically, for OBCs the medium to which the geophones are coupled is the water bottom or sea floor. Using signals acquired using dual sensor cables enables particularly useful forms of seismic data processing. Such forms of seismic data processing generally make use of the fact that the ghost signal is substantially opposite in phase to the acoustic energy traveling upwardly. The opposite phase of the ghost reflection manifests itself in the signals measured by hydrophones by having opposite sign or polarity as compared with the upwardly traveling acoustic energy. Because a geophone is directionally sensitive (whereas a hydrophone is not), the downwardly traveling ghost signal causes another phase reversal in the signal as detected by the geophone, with the result that the upwardly traveling wave and the downwardly traveling ghost signal detected by the geophone will be in phase.

The foregoing relationship between polarities of upgoing and downgoing acoustic energy has led to a number of "deghosting" and water layer effect attenuation techniques. One such technique is described in U.S. Pat. No. 4,486,865 issued to Ruehle. Pairs of detectors each comprise a geophone and a hydrophone. A filter is applied to the output of at least one of the geophone or hydrophone in each pair so that the frequency content of the filtered signal is adjusted. The adjustment to the frequency content is such that when the filtered signal is combined with the signal from the other sensor, the ghost reflections cancel.

U.S. Pat. No. 5,621,700 issued to Moldovenu also discloses using at least one pair of sensors in a method for attenuating ghosts and water layer reverberations.

U.S. Pat. No. 4,935,903 issued to Sanders et al. discloses a method for reducing the effects of water later reverberations which includes measuring pressure at vertically spaced apart depths, or by measuring pressure and particle motion using sensor pairs. The method includes enhancing primary reflection data for use in pre-stack processing by adding ghost data.

U.S. Pat. No. 4,979,150 discloses a method for marine seismic exploration in which output of substantially collocated hydrophones and geophones are subjected to a scale factor. The patent states that collocated hydrophones and geophones can be positioned at the sea floor or above the sea floor.

The benefits of using dual sensor cables have been well recognized. However, techniques known in the art for deghosting and multiple attenuation are typically intended for use with OBCs. Methods known in the art for deghosting and water layer multiple attenuation known in the art work for OBCs because the ghost and water layer multiple energy is typically downgoing at the sea floor, making it relatively simple to discriminate the ghosts and water layer multiples from seismic energy reflected from earth structures beneath the sea floor, which is generally upgoing. It is desirable to be able to deghost and attenuate water layer multiples in dual sensor signals acquired using streamer-type dual sensor cables towed by a vessel. Using dual sensor streamers is particularly desirable because moving a streamer from one location to another is much less time consuming and much less difficult than moving an OBC. Further, it is desirable to have a method for deghosting and multiple attenuation for a dual sensor streamer which is relatively insensitive to the water depth at which the streamer is positioned (towed), is relatively insensitive to undulations in the water surface, and for which knowing the energy source "wavelet" (acoustic signature) beforehand is unnecessary. However, techniques known in the art for deghosting and water layer multiple attenuation have not proven very effective for dual sensor streamer data because at the depth in the water at which streamers typically are towed, water layer multiples may include both upgoing and downgoing components, making directional discrimination difficult.

SUMMARY OF INVENTION

One aspect of the invention is a method for deghosting and water surface multiple reflection attenuation in dual sensor marine seismic data. A method according to this aspect of the invention includes decomposing the data from a plurality of source positions into upgoing and downgoing wavefield components using a measured parameter related to pressure and a measured parameter related to vertical particle motion. A multiple-free wavefield is then determined from the decomposed wavefields. In this aspect of the invention, the deghosting is performed by transforming the data into the spatial frequency domain, and separating upgoing and downgoing wavefield components of the transformed data.

Another aspect of the invention is a method for deghosting seismic data. The seismic data comprise measurements of a vertical component of a parameter related to particle motion and a parameter related to pressure. The measurements related to pressure and particle motion are made collocated, and are made at a plurality of spaced apart positions. The method includes transforming the data into the spatial frequency domain, and separating an upgoing wavefield component of the transformed data. The upgoing wavefield component is the deghosted wavefield.

A method for seismic exploration according to another aspect of the invention includes actuating a seismic energy source in a body of water at a plurality of positions. A parameter related to pressure is measured at a plurality of locations at a selected depth below the surface of the body of water. A parameter related to a vertical component of particle motion is also measured at substantially the same locations as measuring the parameter related to pressure. The measurements of the pressure related parameter and particle motion parameter acquired at each of the plurality of source positions are then decomposed into upgoing and downgoing wavefield components, and a substantially multiple-free wavefield is then determined from the decomposed wavefield components.

Other aspects and advantages of the invention will be apparent from the following description and the appended claims.

DETAILED DESCRIPTION

Figure 1:
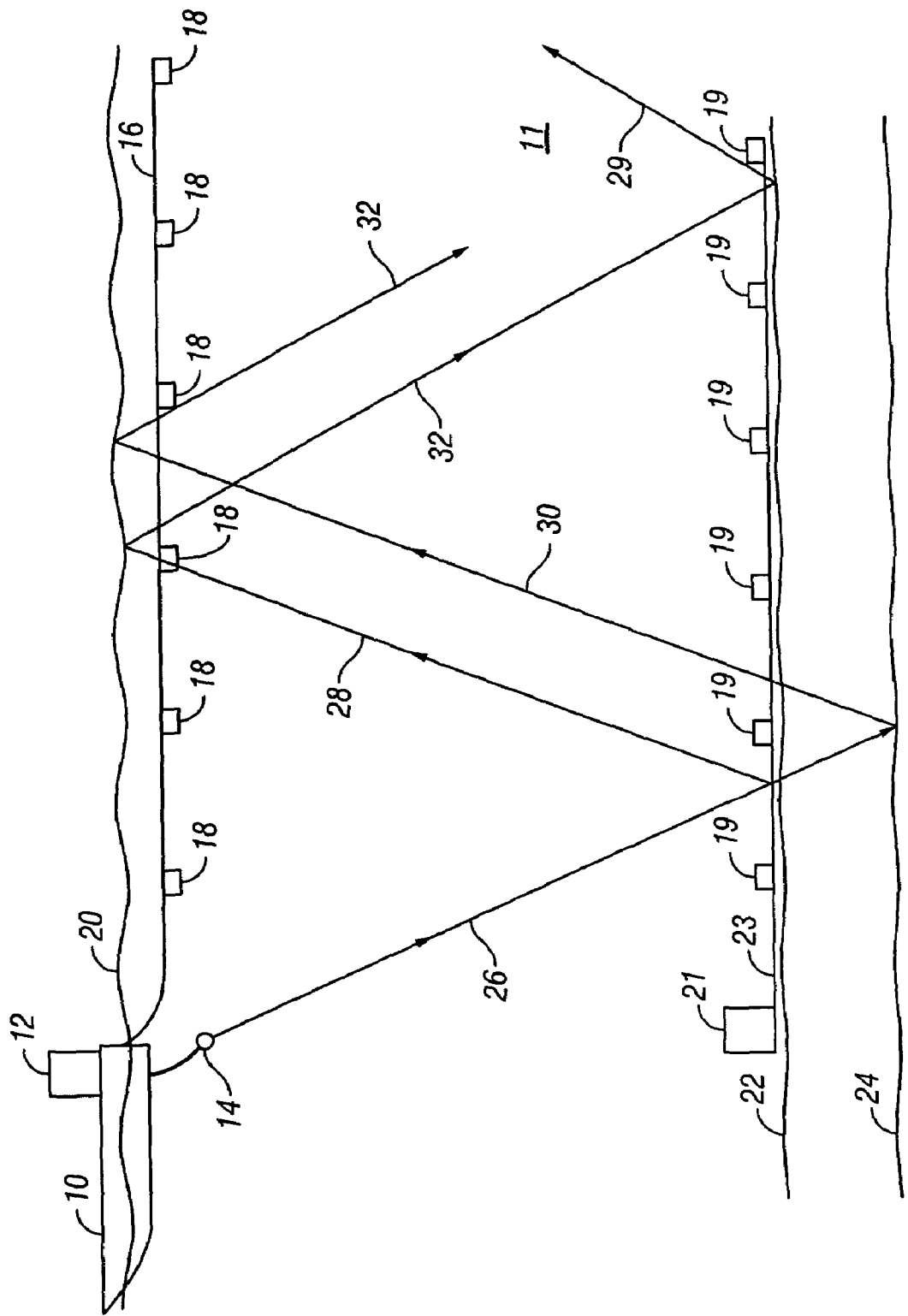
FIG. 1 shows a seismic vessel towing a source and streamer, to acquire signals that can be processed according to one aspect of the invention.

An example technique for acquiring seismic data that can be used with seismic data processing methods according to the invention is shown in FIG. 1. The example in FIG. 1 is two-dimensional, meaning that the technique is related to data acquired using a single seismic sensor cable ("streamer") or an ocean bottom cable. A two-dimensional representation of methods according to the invention is only meant to show the principle of the invention and is not intended to limit the scope of the invention. Methods of data processing according to the invention can also be used with three-dimensional acquisition techniques, in which more than one seismic source and/or laterally spaced apart streamers (and/or ocean bottom cables) are used to acquire seismic data representative of a selected subsurface area.

In FIG. 1, a seismic vessel 10 includes navigation, seismic source control and recording equipment (referred to for convenience hereinafter as the "recording system") of any types well known in the art and shown generally at 12. The recording system 12 causes a seismic source 14 towed in the water 11 to actuate at selected times. The source 14 may be any type well known in the art, including air guns or water guns. In other embodiments, there may be more than one seismic energy source. The actual seismic energy source configuration used is not intended to limit the scope of the invention.

In some embodiments, a dual sensor cable or "streamer" 16 is also towed by the vessel 10. The streamer 16 includes substantially collocated pairs of sensors 18 at spaced apart positions along the cable 16. Each sensor pair 18 includes a sensor (not shown separately) responsive to the pressure in the water 11 or to changes in pressure such as change in pressure with respect to time, and a sensor (not shown) responsive to particle motion of the water 11. As is well known in the art, the pressure responsive sensor may be a hydrophone, and the motion responsive sensor may be an accelerometer, a position sensor or a geophone (responsive to particle velocity). The type of each of the sensors (not shown) actually used in any acquisition system is not intended to limit the scope of the invention. For purposes of the invention, and as will be explained below, it is only necessary to be able to determine a vertical component of the particle motion (or acceleration or velocity) at each sensor pair 18. Sensor arrangements which enable such determination include, for example, a geophone having an orientation measuring device associated therewith such that the vertical component of motion may be calculated from the actual measured motion and the relative orientation of the geophone. Other examples of a sensor include a gimbaled geophone, such that the geophone sensitive axis is oriented substantially vertically at all times. A preferred type of streamer including both particle motion and pressure sensors is disclosed in U.S. patent application Ser. No. 10/233,266, filed on Aug. 30, 2002, entitled, "Apparatus and Method for Multicomponent Marine Geophysical Data Gathering", and assigned to the assignee of the present invention. Said U.S. patent application Ser. No. 10/233,266 is incorporated herein for reference.

In some embodiments, an ocean bottom cable (OBC) shown generally at 23 can be deployed on the water bottom 22. The OBC 23 can be of any type well known in the art, and includes pairs of substantially collocated pressure and particle motion sensors, shown generally at 19, disposed at spaced apart positions along the OBC 23. Signals generated by the sensors 19 are recorded by a recording unit 21 for later retrieval and processing. In some embodiments, both streamers and OBCs can be used to record signals to be processed according to methods that will be explained below with reference to FIGS. 2–4.

Still referring to FIG. 1, when the seismic energy source 14 is actuated, acoustic energy travels downwardly, at 26. Some of the downwardly traveling energy 26 penetrates the water bottom 22 and reaches a subsurface layer boundary 24. Acoustic energy is reflected from the layer boundary 24, whereupon the reflected energy travels upwardly, as shown generally at 30. The upwardly traveling acoustic energy 30 is detected by the sensor pairs 18 on the streamer 16 (or the sensors 19 on the OBC 23 if an OBC is used). The upwardly traveling energy 28 reflects from the water surface 20, whereupon the energy travels downwardly again, as shown at 32. The water surface reflected energy 32 is detected by the sensor pairs 18, (and/or 19) resulting in a ghost signal, as explained in the Background section herein. The water surface reflected energy 32 also may be reflected from the water bottom 22, and becomes upwardly traveling energy, shown generally at 29. Some of the energy emanating directly from the source 14 can also be reflected from the water bottom 22 and becomes part of the energy reflected from the water bottom, as shown at 28. Also as explained in the Background section herein, acoustic energy can reflect from the water surface (downgoing energy 32) and can again reflect from the water bottom (upgoing energy 29) a plurality of times, resulting in water-layer multiple reflections.

As a result of all the foregoing acoustic energy interactions with the water 11 and the structures below the water 11, the acoustic energy detected by the sensor pairs 18, (and/or 19) referred to as a "total wavefield", includes both upwardly traveling energy ("upgoing wavefield") and downwardly traveling energy ("downgoing wavefield"). The upgoing and downgoing wavefields include components resulting from subsurface reflectors, such as boundary 24, and from water surface and water bottom reflections.

Figure 2:
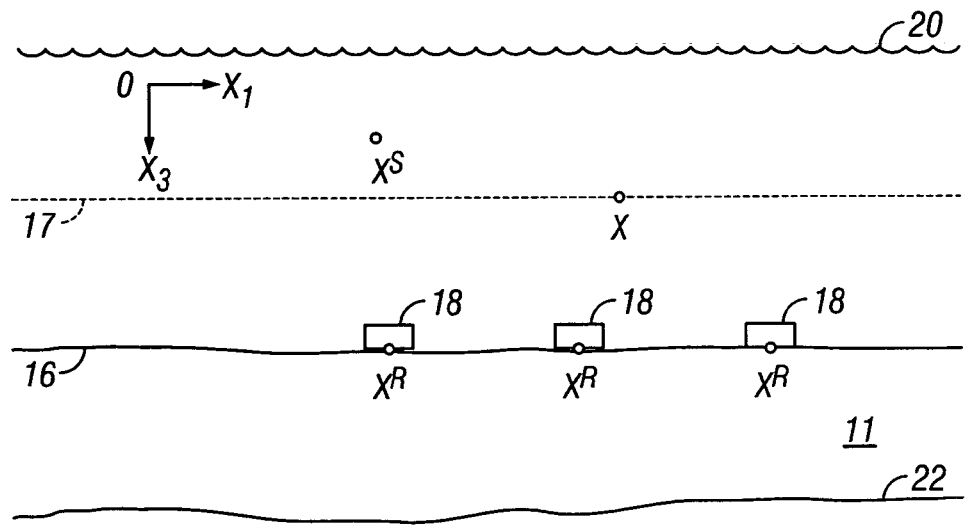
FIG. 2 shows a coordinate system and notation used to explain signal processing methods according to the invention.

FIG. 2 shows a coordinate system that will be used in the following explanation of seismic signal processing methods according to the invention. The coordinate system includes an arbitrarily selected origin, shown at O. Position with respect to the origin O of any other point in the coordinate system can be defined by a horizontal coordinate $x_1$ and a vertical coordinate $x_3$. For convenience, coordinates of a point can be represented by the vector notation x. Position of the source (14 in FIG. 1) is represented by the notation $x^S$, and positions of each of the sensor pairs is represented by the notation $x^R$. Collectively, the sensor (receiver) pair positions are denoted by the domain representation $D^R$.

The actual wavefield is denoted as $\{\hat{p}(x,s),\hat{v}_k(x,s)\}$ in the frequency domain (in which frequency parameter $S=j\omega$). In the foregoing expression for the actual wavefield, $\hat{p}$ denotes the pressure and $\hat{v}_k=\{\hat{v}_1,\hat{v}_3\}$ denotes the particle velocity (in the vertical and horizontal directions, respectively). The actual wavefield is generated by the seismic energy source (14 in FIG. 1) located at position $x^S=\{x_1^S,x_3^S\}$. The actual wavefield is measured at a selected depth below the water surface 20, where a streamer 16 is used. The selected depth will be the total water depth if an OBC (23 in FIG. 1) is used. The water surface 20 is not necessarily a horizontal plane. The measured actual (or "total") wavefield includes energy reflected by the earth's subsurface geology and the sea surface 20. The sensor pairs 18 on the streamer 16 (and/or OBC 23) are located at positions defined, as previously explained, by $X^R \in D^R$. The domain of locations of the sensor pairs 18 on the streamer 16 (and/or OBC 23) also do not necessarily define a horizontal plane.

For purposes of the following analysis, the situation is considered wherein the sensor pair depths are below the source (14 in FIG. 1) depth, implying that $x_3^R > x_3^S$. It is assumed that the water 11 in the domain between the streamer 16 and the sea surface 20 is substantially homogeneous, and has a density represented by $\rho$, and a compressibility represented by $\kappa$. The wave speed, c, is given by the expression $c=(\kappa\rho)^{-1/2}$.

It is assumed for purposes of the following analysis that there always exists a horizontal observation plane 17, disposed at the depth position $x_3=x_3^{obs}$ between the water surface 20 and the depth of the streamer 16 (or OBC 23), and that the observational plane 17 is also located below the source depth $x_3^S$, as shown in FIG. 2.

Some embodiments of a method according to the invention include transforming the data acquired at each sensor pair from the time-space domain into the spatial frequency domain. One method for transforming data from the time-space domain to the spatial frequency domain is the Fourier transform. As a matter of convenience, the Fourier transform in the horizontal direction ($x_1$) is used. This spatial Fourier transform is defined as:

$$\bar{u}(js\alpha_1, x_3, s) = \int_{x_1 \in R} \exp(js\alpha_1 x_1)\hat{u}(x_1, x_3, s)dA \qquad (1)$$

$$\hat{u}(x_1, x_3, s) = \frac{1}{2\pi}\int_{s\alpha_1 \in R} \exp(-js\alpha_1 x_1)\bar{u}(x_1, x_3, s)dA \qquad (2)$$

In the above expressions, $\alpha_1$ represents the horizontal component of the angular slowness vector. Also in the above expressions, dA represents the elementary area of integration. The total wavefield includes both upgoing and downgoing components, as shown in Eq. (3) below:

$$\hat{p}(x_1,x_2,s)=\hat{p}^{down}(x_1,x_2,s)+\hat{p}^{up}(x_1,x_2,s) \qquad (3)$$

In the observational plane 17, disposed at depth $x_3 = x_3^{obs}$, the decomposition of the total wavefield can be carried out in the spatial Fourier domain where the spectral counterparts are given by the expressions:

$$\bar{p}^{down}(js\alpha_1, x_3, s) = \bar{P}^{down}(js\alpha_1, s) \exp(-s\Gamma x_3) \quad (4)$$

and $$\bar{p}^{up}(js\alpha_1, x_3, s) = \bar{P}^{up}(js\alpha_1, s) \exp(s\Gamma x_3) \quad (5)$$

in which $$\Gamma = \left(\frac{1}{c^2} + \alpha_1^2\right)^{\frac{1}{2}}, \text{Re}(\Gamma) > 0 \quad (6)$$

It is assumed, as shown above in Eq. (6), that the real component of $\Gamma$ is positive. Using the field reciprocity theorem (see, for example, J. T. Fokkema and P. M. van den Berg, *Seismic Applications of Acoustic Reciprocity*, Elsevier, Amsterdam, 1993, Chapter 10.1) it can be inferred that the upgoing wavefield is uniquely determined by the measured pressure and the normal component of the particle velocity at the sensor domain $D^R$ by the expression:

$$\bar{P}^{up}(js\alpha_1, s) = \frac{-1}{2s\Gamma} \int_{x^R \in D^R} \begin{bmatrix} \hat{v}_k(x^R, s) s \rho \exp(js\alpha_1 x_1^R - s\Gamma x_3^R) + \\ \hat{p}(x^R, s) \partial_k^R \exp(js\alpha_1 x_1^R - s\Gamma x_3^R) \end{bmatrix} v_k \, dA \quad (7)$$

where $\hat{p}(x^R, s)$ and $v_k \hat{v}_k(x^R, s)$ are the frequency domain measured total wavefield quantities, namely, the pressure and the normal component of the particle motion (velocity). In the case where the streamer 16 is substantially horizontal the normal component of the particle velocity becomes the vertical component, $\hat{v}_3$. Further, in Eq. (7), $\partial_k^R = (\partial_1^R, \partial_3^R)$ denotes spatial differentiation with respect to $x^R$.

The particle velocity and the pressure of the upgoing wavefield are related to each other by the expression:

$$\rho \bar{v}_3^{up}(js\alpha_1, x_3, s) + \Gamma \bar{p}^{up}(js\alpha_1, x_3, s) = 0 \text{ at } x_3 = x_3^{obs} \quad (8)$$

In the particular case where the domain of sensor locations, $D^R$, forms a horizontal plane at $x_3 = x_3^R$ ($v_k = \delta_{k,3}$), Eq. (7) can be recognized as a spatial Fourier transform with the result:

$$\bar{P}^{up}(js\alpha_1, s) = \frac{\exp(-s\Gamma x_3^R)}{-2\Gamma}[\rho \bar{v}_3(js\alpha_1, x_3^R, s) - \Gamma \bar{p}(js\alpha_1, x_3^R, s)] \quad (9)$$

Combining Eqs. (5) and (9), the spatial Fourier transform of the upgoing wavefield then becomes:

$$\bar{P}^{up}(js\alpha_1, x_3, s) = \quad (10)$$

$$\frac{\exp[s\Gamma(x_3 - x_3^R)]}{-2\Gamma}[\rho \bar{v}_3(js\alpha_1, x_3^R, s) - \Gamma \bar{p}(js\alpha_1, x_3^R, s)]$$

In the particular case where the streamer 16 is substantially horizontal, the depth of the observational plane 17 may be set to the receiver/sensor (streamer) depth, whereby $x_3^{obs} = x_3^R$, and the pressure of the upgoing wavefield can be determined by the expression:

$$\bar{P}^{up}(js\alpha_1, x_3^R, s) = \frac{1}{-2\Gamma}[\rho \bar{v}_3(js\alpha_1, x_3^R, s) - \Gamma \bar{p}(js\alpha_1, x_3^R, s)] \quad (11)$$

Similarly, the vertical component of the particle velocity can be obtained by the expression:

$$\bar{v}_3^{up}(js\alpha_1, x_3^R, s) = \frac{1}{2\rho}[\rho \bar{v}_3(js\alpha_1, x_3^R, s) - \Gamma \bar{p}(js\alpha_1, x_3^R, s)] \quad (12)$$

Note that $\{\bar{p}^{up}, \bar{v}_3^{up}\}$ represents the upgoing wavefield as reflected from the subsurface earth geology (e.g. layer 24 in FIG. 1), and is obtained from the total measured wavefield quantities. As previously explained, Eq. (10) is the spatial Fourier transform of the deghosted wavefield. A simple inverse Fourier transform of Eq. (10) provides the deghosted wavefield in the time-space domain.

The foregoing analysis shows that if both the pressure (or related parameter such as pressure gradient) and the particle velocity (or related parameter such as acceleration) are measured, it is possible to obtain the receiver-deghosted wavefield without notches in the frequency spectrum. The streamer 16 may be positioned at any selected water depth and the results are independent of the nature (geometry) of the sea surface 20. Using the power reciprocity theorem, (see J. T. Fokkema and P. M. van den Berg, *Seismic Applications of Acoustic Reciprocity*, Elsevier, Amsterdam, 1993, Chapter 10.2) the downgoing wavefield can also be uniquely determined by the measured pressure and normal component of the particle velocity at the receiver domain $D^R$ by the expression:

$$\bar{P}^{down}(js\alpha_1, s) = \quad (13)$$

$$\frac{1}{2s\Gamma} \int_{x^R \in D^R} \begin{bmatrix} \hat{v}_k(X^R, s) s \rho \exp(js\alpha_1 x_1^R - s\Gamma x_3^R) + \\ \hat{p}(X^R, s) \partial_k^R \exp(js\alpha_1 x_1^R - s\Gamma x_3^R) \end{bmatrix} v_k \, dA$$

where $\hat{p}(x^R, s)$ and $v_k \hat{v}_k(x^R, s)$ are the frequency domain transforms of the measured field quantities, namely, the pressure and the normal component of the particle velocity.

The vertical component of the particle velocity and the pressure of the downgoing wavefield at the depth of the observation plane 17 are related to each other by the expression:

$$\rho \bar{v}_3^{down}(js\alpha_1, x_3, s) - \Gamma \bar{p}^{down}(js\alpha_1, x_3, s) = 0 \text{ at } x_3 = x_3^{obs} \quad (14)$$

In the case that the sensor positions within domain $D^R$ define a substantially horizontal plane at the depth of the observation plane 17, wherein $x_3 = x_3^R$ ($v_k = \delta_{k,3}$), the expression for the amplitude $\bar{P}^{down}$ reduces to:

$$\bar{P}^{down}(js\alpha_1, s) = \frac{\exp(s\Gamma x_3^R)}{2\Gamma}[\rho \bar{v}_3(js\alpha_1, x_3^R, s) + \Gamma \bar{p}(js\alpha_1, x_3^R, s)] \quad (15)$$

Combining Eqs. (4) and (15), the spatial Fourier transform of the downgoing pressure wavefields becomes:

$$\bar{p}^{down}(js\alpha_1, x_3, s) = \qquad (16)$$

$$\frac{\exp(-s\Gamma(x_3 - x_3^R))}{2\Gamma}[\rho\bar{v}_3(js\alpha_1, x_3^R, s) + \Gamma\bar{p}(js\alpha_1, x_3^R, s)]$$

In the case where the streamer 16 (and/or OBC 23) is substantially horizontal, the observational plane 17 may have its depth selected as the streamer (or OBC) depth, whereby $x_3^{obs} = x_3^R$, the pressure of the downgoing wavefield can be obtained by the expression:

$$\bar{p}^{down} = (js\alpha_1, x_3^R, s) = \frac{1}{2\Gamma}[\rho\bar{v}_3(js\alpha_1, x_3^R, s) + \Gamma\bar{p}(js\alpha_1, x_3^R, s)] \qquad (17)$$

and the vertical component of the particle velocity can be obtained by the expression:

$$\bar{v}_3^{down} = (js\alpha_1, x_3^R, s) = \frac{1}{2\rho}[\rho\bar{v}_3(js\alpha_1, x_3^R, s) + \Gamma\bar{p}(js\alpha_1, x_3^R, s)] \qquad (18)$$

Note that the downgoing wavefield $\{\bar{p}^{down}, \bar{v}_3^{down}\}$ also includes the incident wavefield (the energy directly emanating from the source [14 in FIG. 1]) and its source ghost. Because the observational (or signal measurement) domain is lower in depth than the source position $x^S$, the incident wavefield and source ghost components are downgoing with respect to the sensor positions. The pressure of the incident ghost wavefield is denoted as $\bar{p}^{inc,H}$.

The downgoing wavefield is written as a superposition of the incident wavefield and a scattered wavefield $\hat{p}^{sct,down}$ as:

$$\hat{p}^{down} = \hat{p}^{inc,H} + \hat{p}^{sct,down} \text{ for } x_3 = x_3^{obs}. \qquad (19)$$

Note that the incident ghost wavefield $\bar{p}^{inc,H}$ vanishes at the water surface 20.

If it is assumed that the water surface 20 is a substantially perfectly reflecting plane at $x_3 = 0$, it can be observed that:

$$\hat{p}^{up}(x_1, 0, s) + \hat{p}^{down}(x_1, 0, s) = 0 \qquad (20)$$

and because the incident ghost wavefield $\bar{p}^{inc,H}$ vanishes as well at the water surface 20, it can be observed that in view of Eq. (19), $$\hat{p}^{up}(js\alpha_1, 0, s) + \hat{p}^{sct,down}(js\alpha_1, 0, s) = 0 \qquad (21)$$

or, taking into account the propagation path:

$$\bar{p}^{sct,down}(js\alpha_1, x_3, s) = \exp(-2s\Gamma x_3)\bar{p}^{up}(js\alpha_1, x_3, s) \qquad (22)$$

Using Eqs. (19) and (22), it can be observed that:

$$\bar{p}^{inc,H}(js\alpha_1, x_3, s) = \bar{p}^{down}(js\alpha_1, x_3, s) + \exp(-2\Gamma x_3)\bar{p}^{up}(js\alpha_1, x_3, s) \text{ at } x_3 = x_3^{obs}. \qquad (23)$$

It can be observed that the wavefields $\bar{p}^{up}$ and $\bar{p}^{down}$ in Eq. (23) are the results arrived at from the decomposition procedure previously explained above.

Moreover, if it is assumed that the wavefield is generated by a point source located at $x = x^S$, then the incident wavefield, including its source ghost, is given in the spatial Fourier domain by the expression:

$$\bar{p}^{inc,H}(js\alpha_1, x_3^R, s) = \qquad (24)$$

$$\hat{W}^S(s)\exp(js\alpha_1 x_1^S - s\Gamma x_3)\frac{\sinh(s\Gamma x_3^S)}{s\Gamma} \text{ for } x_3 > x_3^S,$$

In Eq. (24) $\hat{W}^S(s)$ denotes the source wavelet in the frequency domain. Therefore, Eqs. (23) and (24) enable determining the source wavelet from the measured pressure and particle velocity. A robust manner for determining the source wavelet is to minimize the least-square differences between the right-hand sides of Eqs. (23) and (24), for all values of $\alpha_1$.

Having identified the source wavelet and the downgoing wavefield, a next processing step is to remove the multiples related to the water surface 20. The knowledge of the upgoing and downgoing wavefield, together with the source wavelet, can be used in water layer multiple removal procedures known in the art. However, it will be shown below that in principle the assumption of a planar water surface and knowledge of the source including the source wavelet are unimportant for the water layer multiple removal procedure and further processing after it.

The explanation of multiple removal methods that do not depend on source wavelet knowledge and a planar water surface begins with the propagation invariant at the observation level $x_3 = x_3^{obs}$ that follows from the reciprocity theorem. See, for example Section 4.2.2 of J. W. Schoolmeesters, *Three-dimensional processing of marine seismic data by spectral decomposition*, Ph.D. Thesis, Delft University of Technology, 7 Jun. 2001. In the two dimensional notation shown in FIG. 2, the propagation invariant at the observation level $x_3 = x_3^{obs}$ is given by the expression:

$$\frac{1}{2\pi}\int_{s\alpha_1 \in R}\left[\begin{array}{c}\bar{p}^A(js\alpha_1, x_3, s)\bar{v}_3^B(-js\alpha_1, x_3, s) - \\ \bar{p}^B(-js\alpha_1, x_3, s)\bar{v}_3^A(js\alpha_1, x_3, s)\end{array}\right]dA = 0 \qquad (25)$$

in which $\{\bar{p}^A, \bar{v}_3^A\}$ and $\{\bar{p}^B, \bar{v}_3^B\}$ are two possible acoustic states, A and B. The acoustic states will be further explained below with reference to Eq. (28). Writing each of the states, A and B, as a superposition of upgoing and downgoing wavefields, that is:

$$\bar{p}^A = \bar{p}^{A,up} + \bar{p}^{A,down} \text{ and } \bar{p}^B = \bar{p}^{B,up} + \bar{p}^{B,down} \qquad (26)$$

and noting that only oppositely propagating waves contribute, Eq. (25) becomes:

$$\frac{1}{2\pi}\int_{s\alpha_1 \in R}\left[\begin{array}{c}\bar{p}^{A,up}(js\alpha_1, x_3, s)\bar{v}_3^{B,down}(-js\alpha_1, x_3, s) - \\ \bar{p}^{B,down}(-js\alpha_1, x_3, s)\bar{v}_3^{A,up}(js\alpha_1, x_3, s) + \\ \bar{p}^{A,down}(js\alpha_1, x_3, s)\bar{v}_3^{B,up}(-js\alpha_1, x_3, s) - \\ p^{B,up}(-js\alpha_1, x_3, s)\bar{v}_3^{A,down}(js\alpha_1, x_3, s)\end{array}\right]dA = 0 \qquad (27)$$

Using the relations for the upgoing wavefields of the type of Eq. (8) and the downgoing wavefields of the type of Eq. (14), the second term can be combined with the first term, and the third term can be combined with the fourth term in the left-hand side of Eq. (27), thus providing the expression:

$$\frac{1}{2\pi}\int_{s\alpha_1 \in R}\left[\begin{array}{c}\bar{p}^{A,up}(js\alpha_1, x_3, s)\bar{v}_3^{B,down}(-js\alpha_1, x_3, s) - \\ \bar{p}^{B,up}(-js\alpha_1, x_3, s)\bar{v}_3^{A,down}(js\alpha_1, x_3, s)\end{array}\right]d A = 0 \quad (28)$$

which is the propagation invariant for upgoing and downgoing wavefields. This propagation invariant is the basis for the removal of water surface multiples.

In one embodiment of a water surface multiple removal procedure, let the previously described State A be the desired multiple-free wavefield and let $\{\hat{p}^r, \hat{v}_3^r\}$ denote the pressure and particle motion components of the reflected wavefield. The reflected wavefield is the wavefield that would occur in the absence of the water surface 20. The reflected wavefield is upgoing at the depth of the observational plane 17. The incident wavefield that generates the reflected wavefield is denoted as $\{\hat{p}^{inc}, \hat{v}_3^{inc}\}$. The incident wavefield is downgoing at the depth of the observational plane 17, while the reflected wavefield is upgoing, as previously stated. The previously described State B is the actual total measured wavefield including water surface multiple reflections. State B includes an up going wavefield $\{\hat{p}^{up}, \hat{v}_3^{up}\}$ and a downgoing wavefield $\{\hat{p}^{down}, \hat{v}_3^{down}\}$. Decomposing the upgoing and downgoing wavefield are explained above with respect to Eqs. (10) and (15). Substituting States A and B into Eq. (28) provides the expression:

$$\frac{1}{2\pi}\int_{s\alpha_1 \in R}\left[\begin{array}{c}\bar{p}^r(js\alpha_1, x_3, s)\bar{v}_3^{down}(-js\alpha_1, x_3, s) - \\ \bar{p}^{up}(-js\alpha_1, x_3, s)\bar{v}_3^{inc}(js\alpha_1, x_3, s)\end{array}\right]d A = 0 \quad (29)$$

where $x_3 = x_3^{obs}$. The propagation invariant of Eq. (29) holds, independently of the nature of the sea surface 20. In addition, the propagation invariant holds for any choice of incident wavefield that generates a reflected wavefield $\hat{p}^r$. A consequence is that it becomes possible to choose a source position and a source wavelet arbitrarily. The multiple-removal procedure should then lead to the multiple-free wavefield $\{\hat{p}^r, \hat{v}_3^r\}$. Therefore, in one embodiment a point source position is selected at $x^{Sr}$ with a selected desired wavelet $\hat{W}^{Sr}(s)$, so that:

$$s\rho v_3^{inc}(js\alpha_1, x_3, s) = \frac{1}{2}\hat{W}^{Sr}(s)\exp[js\alpha_1 x_1^{Sr} - s\Gamma(x_3 - x_3^{Sr})] \text{ for } x_3 > x_3^{Sr} \quad (30)$$

To make the removal procedure operational, the propagation invariant is considered in the spatial domain. Using Parseval's theorem, Eq. (29) becomes:

$$\int_{x_1 \in R}\left[\begin{array}{c}\hat{p}^r(x_1, x_3, s)\hat{v}_3^{down}(x_1, x_3, s) - \\ \hat{p}^{up}(x_1, x_3, s)\hat{v}_3^{inc}(x_1, x_3, s)\end{array}\right]d A = 0 \quad (31)$$

where $x_3 = x_3^{obs}$. In order to indicate the different source positions $x^S$ of the actual (measured) wavefield and $x^{Sr}$ of the desired, multiple-free wavefield, the propagation invariant can be written as:

$$\int_{x_1 \in R}\hat{p}^r(x|x^{Sr}, s)\hat{v}_3^{down}(x|x^S, s)d A = \int_{x_1 \in R}\hat{p}^{up}(x|x^S, s)\hat{v}_3^{inc}(x|x^{Sr}, s)d A \quad (32)$$

The right-hand side of Eq. (32) is known from the upgoing and downgoing wavefield decomposition, as previously explained. In the left-hand side of Eq. (32), $\hat{v}_3^{down}$ is known, while $\hat{p}^r$ unknown, and represents the multiple-free wavefield. The multiple-free wavefield can be determined by solving a system of equations. The system of equations in one embodiment includes providing the equivalent of Eq. (32) for each of a plurality of source positions $x^S$ around one particular point source position $x^{Sr}$. The particular point source position $x^{Sr}$ may be selected arbitrarily.

When the point source is used as a source position for the desired wavefield, in one embodiment, the equations are transformed to the spatial frequency domain by using Parseval's theorem in the right-hand side of Eq. (32), substituting Eq. (30), and reverse transforming to the space domain. Then, the result is:

$$\int_{x_1 \in R}\hat{p}^r(x|x^{Sr}, s)s\rho\hat{v}_3^{down}(x|x^S, s)d A = \frac{1}{2}\left[\hat{W}^{Sr}(s)\hat{p}^{up}(x^{Sr}|x^S, s)\right] \quad (33)$$

Note that, after the calculation of the pressure $\hat{p}^r(x|x^{Sr}, s)$, the related particle velocity $\hat{v}_3^r(x|x^{Sr}, s)$ in the substantially multiple-free reflected wavefield follows simply from Eq. (8), by using the previously described spatial Fourier transform and inverse Fourier transform.

The result of Eq. (33) shows one embodiment of the water surface multiple removal procedure. Although Eqs. (28) and (29) are formulated in the spatial and frequency domain, these equations can also be written in the spatial Fourier and frequency domain.

Figure 3:
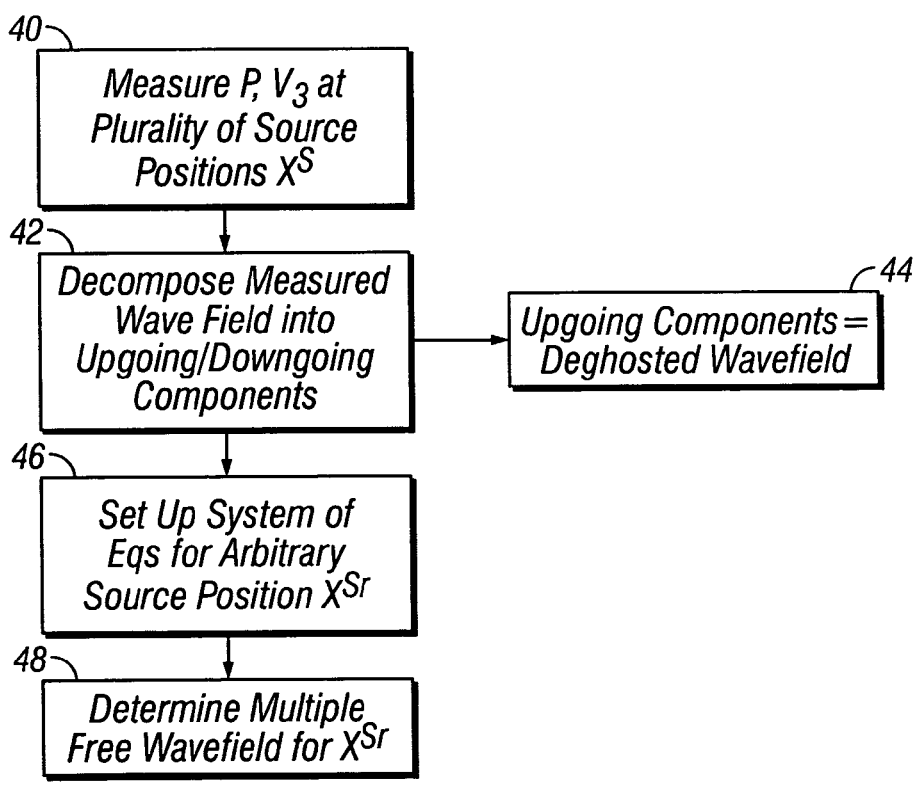
FIG. 3 is a flow chart of an example embodiment of a method according to the invention.

For the assumed case of a horizontal, planar streamer (or OBC), the processing sequence in the frequency domain can be summarized as follows and as shown in the flow chart in FIG. 3. The processing begins, at 40, with the measured data of the pressure, and at least the vertical component of the particle velocity, $\hat{v}_3(x^R|x^S, s)$ where $x^S$ is the source position for each actuation of the seismic source. The source label may also include a position corresponding, for example, the midpoint of a source array where an array of air guns is used. $x^R$ is an element of the receiver array.

For the actual removal procedure, first the upgoing wavefield, $\{\hat{p}^{up}(x^R|x^S, s), \hat{v}_3^{up}(x^R|x^S, s)\}$, using the spatial Fourier transform and Eqs. (11) and (12), and the downgoing wavefield, $\{\hat{p}^{down}(x^R|x^S, s), \hat{v}_3^{down}(x^R|x^S, s)\}$, using Eqs. (17) and (18) are decomposed, as shown at 42. In fact, the upgoing wavefield is the deghosted wavefield, as previously explained and as shown at 44. This processing step can be carried out for each source label separately (shot-based processing).

The water layer multiple removal in one embodiment includes setting up, at 46, and solving, at 48, a system of equations for a plurality of source positions (the discrete case of Eq. (33)). Advantageously, the invention provides a method for deghosting and water surface multiple removal which is substantially independent of the source wavelet, the water surface geometry and the depth of seismic sensors in the water. Therefore, corrections for undulation of the water surface are not needed, and it is unnecessary to determine the source wavelet using methods according to the invention. Methods according to the invention can also effectively deghost and attenuate water layer multiples in seismic data acquired using dual sensor streamers, which has proven impractical using methods previously known in the art.

Figure 4:
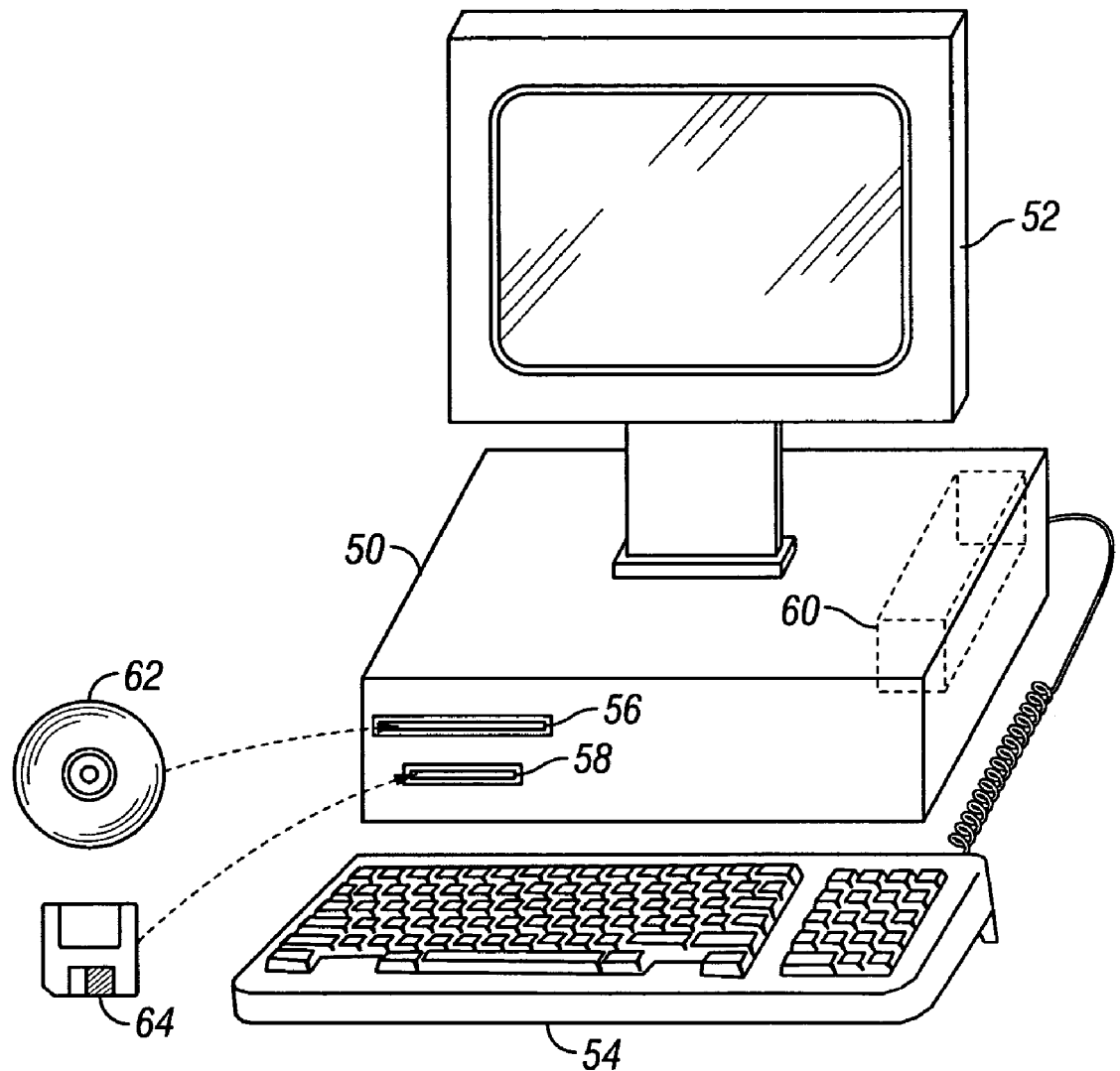
FIG. 4 shows a general purpose programmable computer configured to read a computer program according to the invention.

The foregoing embodiments of methods according to the various aspects of the invention may be performed by a suitably programmed general purpose computer. An example of such a computer is shown in FIG. 4 having a central processor 50. The processor 50 is coupled to a user input device 54 such as a keyboard, and is coupled to a display 52 such as a cathode ray tube (CRT) or flat panel liquid crystal display (LCD). A computer program according to this aspect of the invention may reside on any one of a number of types of computer readable medium, such as compact disk 62 insertable into a CD reader 56, magnetic "floppy" disk 64 insertable into a floppy disk drive 58, or the program may reside in a hard drive 60 within or remote from the processor 50. The program includes logic operable to cause a programmable computer to perform the data processing sequences described above with respect to FIGS. 1–3. The particular embodiment in which a computer program is stored is not meant to limit the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for deghosting and water surface multiple reflection attenuation in dual sensor marine seismic data, comprising:
   transforming data acquired at each of a plurality of source positions by the spatial Fourier transform into the spatial Fourier domain;
   decomposing the transformed data into upgoing and downgoing wavefield components using a measured parameter related to pressure and measured parameter related to vertical particle motion; and
   determining a substantially multiple-free wavefield from the decomposed wavefield components, by solving a system of differential equations in the spatial Fourier domain for measured total wavefield and measured multiple free wavefield at the plurality of source positions.

2. The method of claim 1 wherein the data are acquired at a plurality of spaced apart locations at a selected depth below the water surface using a dual sensor streamer.

3. The method of claim 2 wherein the selected depth is below a depth of a seismic energy source.

4. The method of claim 1 wherein the data are acquired using an ocean bottom cable.

5. The method of claim 1 wherein the parameter related to pressure comprises change in pressure with respect to time.

6. The method of claim 1 wherein the parameter related to vertical particle motion comprises particle velocity.

7. The method of claim 1 wherein the parameter related to vertical particle motion comprises the particle acceleration.

8. The method of claim 1 further comprising determining a source wavelet from the decomposed wavefield components.

9. A method for seismic exploration, comprising:
   actuating a seismic energy source in a body of water at a plurality of positions; measuring a parameter related to pressure at a plurality of locations at a selected depth below the surface of the body of water;
   measuring a parameter related to a vertical component of particle motion at substantially the same locations as measuring the parameter related to pressure;
   transforming the measurements acquired at each of a plurality of source positions by the spatial Fourier transform into the spatial Fourier domain;
   decomposing the transformed measurements of the pressure related parameter and particle motion parameter into upgoing and downgoing wavefield components; and
   determining a substantially multiple-free wavefield from the decomposed wavefield components independently of knowledge of a source wavelet;
   determining a substantially multiple-free wavefield from the decomposed wavefield components, by solving a system of differential equations in the spatial Fourier domain for measured total wavefield and measured multiple free wavefield at the plurality of source positions.

10. The method of claim 9 wherein the selected depth is below a depth at which the seismic energy source is actuated.

11. The method of claim 9 wherein the parameter related to pressure comprises change in pressure with respect to time.

12. The method of claim 9 wherein the parameter related to vertical particle motion comprises particle velocity.

13. The method of claim 9 wherein the parameter related to vertical particle motion comprises the particle acceleration.

14. The method of claim 9 wherein the decomposing comprises:
   transforming the data into the spatial Fourier domain;
   separating an upgoing wavefield component of the transformed data in the spatial Fourier domain; and
   inverse transforming the upgoing component into the spatial frequency domain.

15. The method of claim 9 further comprising determining a source wavelet from the decomposed wavefield components.

16. The method of claim 9 wherein the data are acquired using a dual sensor streamer.

17. The method of claim 9 wherein the data are acquired using an ocean bottom cable.

18. A computer program stored in a computer readable medium, the program containing logic operable to cause a programmable computer to perform steps comprising:
   transforming seismic signals acquired at each of a plurality of seismic energy source positions by the spatial Fourier transform into the spatial Fourier domain;
   decomposing the transformed seismic signals into upgoing and downgoing wavefield components using a measured parameter related to pressure and measured parameter related to vertical particle motion; and
   determining a substantially multiple-free wavefield from the decomposed wavefield components independently of knowledge of a source wavelet;
   determining a substantially multiple-free wavefield from the decomposed wavefield components, by solving a system of differential equations in the spatial Fourier domain for measured total wavefield and measured multiple free wavefield at the plurality of source positions.

19. The program of claim 18 wherein the seismic signals are acquired at a plurality of spaced apart locations at a selected depth below a water surface.

20. The program of claim 18 wherein the selected depth is below a depth at which a seismic energy source is disposed.

21. The program of claim 18 wherein the parameter related to pressure comprises change in pressure with respect to time.

22. The program of claim 18 wherein the parameter related to vertical particle motion comprises particle velocity.

23. The program of claim 18 wherein the parameter related to vertical particle motion comprises the particle acceleration.

24. A method for seismic exploration, comprising:
    towing at least one seismic energy source in a body of water;
    towing at least one seismic streamer at a selected depth in the body of water, the streamer having a plurality of sensor sets thereon, each of the plurality of sensor sets having thereon a first sensor adapted to measure a parameter related to pressure of the water and a second sensor adapted to measure a parameter related to a vertical component of particle motion at substantially the same locations as first sensor;
    actuating the seismic energy source at a plurality of positions in the water;
    measuring signals generated by each of the first and second sensors in the sensor sets in response to each of the actuations of the source;
    transforming the measurements acquired at each of the plurality of source positions by the spatial Fourier transform into the spatial Fourier domain;
    decomposing the transformed measurements of the pressure related parameter and particle motion parameter into upgoing and downgoing wavefield components; and
    determining a substantially multiple-free wavefield from the decomposed wavefield components independently of knowledge of a source wavelet;
    determining a substantially multiple-free wavefield from the decomposed wavefield components, by solving a system of differential equations in the spatial Fourier domain for measured total wavefield and measured multiple free wavefield at the plurality of source positions.

25. The method of claim 24 wherein the selected depth is below a depth at which the seismic energy source is actuated.

26. The method of claim 24 wherein the parameter related to pressure comprises change in pressure with respect to time.

27. The method of claim 24 wherein the parameter related to vertical particle motion comprises particle velocity.

28. The method of claim 24 wherein the parameter related to vertical particle motion comprises the particle acceleration.

29. The method of claim 24 wherein the decomposing comprises transforming the measurements into the spatial Fourier domain and separating the upgoing and downgoing wavefield components in the transformed measurements.

30. The method of claim 24 further comprising:
    deploying at least one ocean bottom cable having a plurality of substantially collocated sensor pairs at spaced apart positions thereon, the sensor pairs including a sensor responsive to a parameter related to pressure and a sensor responsive to particle motion;
    measuring signals generated by each of the sensors in the sensor pairs in response to each of the actuations of the source;
    decomposing the measurements of the pressure related parameter and particle motion parameter acquired at each of the plurality of source positions into upgoing and downgoing wavefield components; and
    determining a substantially multiple-free wavefield from the decomposed wavefield components independently of knowledge of a source wavelet.

* * * * *